Nov. 13, 1928.
R. L. CLEWELL ET AL
1,691,225
FISH LURE
Filed July 13, 1926
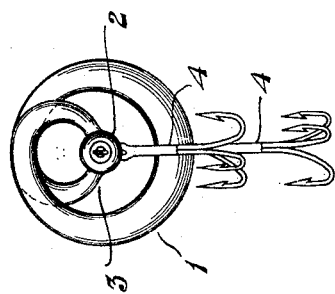
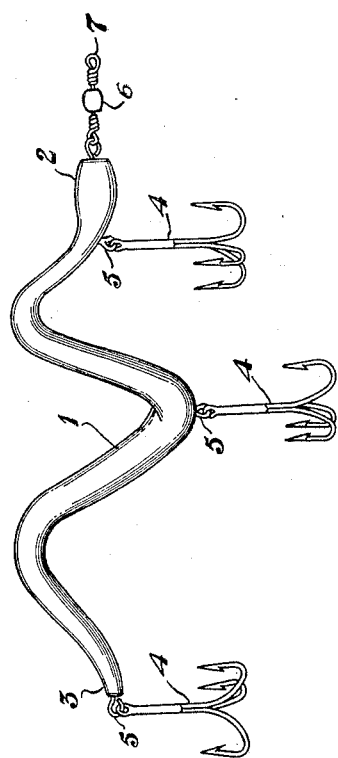
Inventor
Robert L. Clewell,
Charles W. Clewell.

Patented Nov. 13, 1928.

1,691,225

UNITED STATES PATENT OFFICE.

ROBERT L. CLEWELL AND CHARLES W. CLEWELL, OF CANTON, OHIO; SAID CHARLES W. CLEWELL ASSIGNOR TO SAID ROBERT L. CLEWELL.

FISH LURE.

Application filed July 13, 1926. Serial No. 122,110.

The invention relates to artificial bait or lures arranged to be drawn through the water and rotated to imitate the swimming movement of an eel or snake.

The object of the invention is to provide a fish lure in the form of a snake or eel of helical spiral form, provided with hooks and arranged to be rotated, as it is drawn through the water, to produce a movement similar to the swimming movement of a snake or eel; and this object may be attained by forming the lure of spiral shape, similar to the body of a snake or eel, the head and tail thereof being preferably located substantially in the axis of the spiral, a swivel being provided upon the head for the connection of a line, whereby the spiral body will rotate upon its axis as it is drawn through the water without twisting the line.

An embodiment of the invention is illustrated in the accompanying drawing, in which Figure 1 is a side elevation of the improved fish lure, and Fig. 2, an end elevation of the same.

Similar numerals refer to similar parts throughout the drawing.

The body 1 of the improved fish lure may be made of any suitable material in the sinuous form of a snake or eel of helical spiral shape, the head 2 of which is preferably located in the axis of the spiral as best illustrated in Fig. 2.

The tail portion 3 is also preferably terminated in the axis of the spiral as illustrated. The body 1 may be painted or decorated to give the appearance of an eel, snake or the like and is provided with a plurality of hooks 4 loosely connected thereto as by the eyes 5 connected to spaced points of the body.

A swivel 6, of any suitable construction, is connected to the head end of the device and provided with an eye 7 for the connection of the line whereby the lure may rotate in the water without twisting the line.

When the device is drawn through the water, as in casting or trolling, the spiral formation of the body of the lure will cause it to rotate in the water, and since the line is connected to the head, in the axis of the spiral, the body will rotate upon its axis giving the appearance of a snake or eel swimming through the water.

By terminating the tail portion of the lure in the axis of the spiral the body will tend to rotate entirely upon the axis of the spiral, as it is drawn through the water, thus imitating very closely the swimming movement of a snake or the like.

We claim:

1. A fish lure comprising a sinuous body of substantially round cross section of rigid helical and spiral form, hooks carried by the body and means for attaching a line for drawing the same through the water.

2. A fish lure comprising a sinuous body of substantially round cross section of rigid helical and spiral form having a head portion located in the axis of the spiral, and helix, hooks carried by said body and means for attaching a line for drawing the same through the water.

3. A fish lure comprising a sinuous body of substantially round cross section of rigid helical and spiral form having a head portion located in the axis of the spiral and helix, hooks carried by said body and means for attaching a line to the head for drawing the same through the water.

4. A fish lure comprising a sinuous body of substantially round cross section of rigid helical and spiral form having a head portion and a tail portion located in the axis of the spiral and helix, hooks carried by said body and means for attaching a line to the head for drawing the same through the water.

5. A fish lure comprising a sinuous body of substantially round cross section of rigid helical and spiral form having a head portion and a tail portion located in the axis of the spiral and helix, hooks carried by said body and means for attaching a line for drawing the same through the water.

6. A fish lure comprising a sinuous body of substantially round cross section of rigid helical and spiral form having a head portion located in the axis of the spiral and helix, hooks carried by said body, and a swivel upon said head for connecting a line for drawing the body through the water.

7. A fish lure comprising a sinuous body of substantially round cross section of rigid helical and spiral form having a head portion located at one end, hooks carried by said body and means for attaching a line for drawing the same through the water.

In testimony that we claim the above, we have hereunto subscribed our names.

ROBERT L. CLEWELL.
CHARLES W. CLEWELL.